April 5, 1966 E. S. BABSON 3,244,114
CONVEYOR APPARATUS

Filed Jan. 17, 1964 3 Sheets-Sheet 1

Inventor
Edward S. Babson
By his Attorney
Robert S. Ross

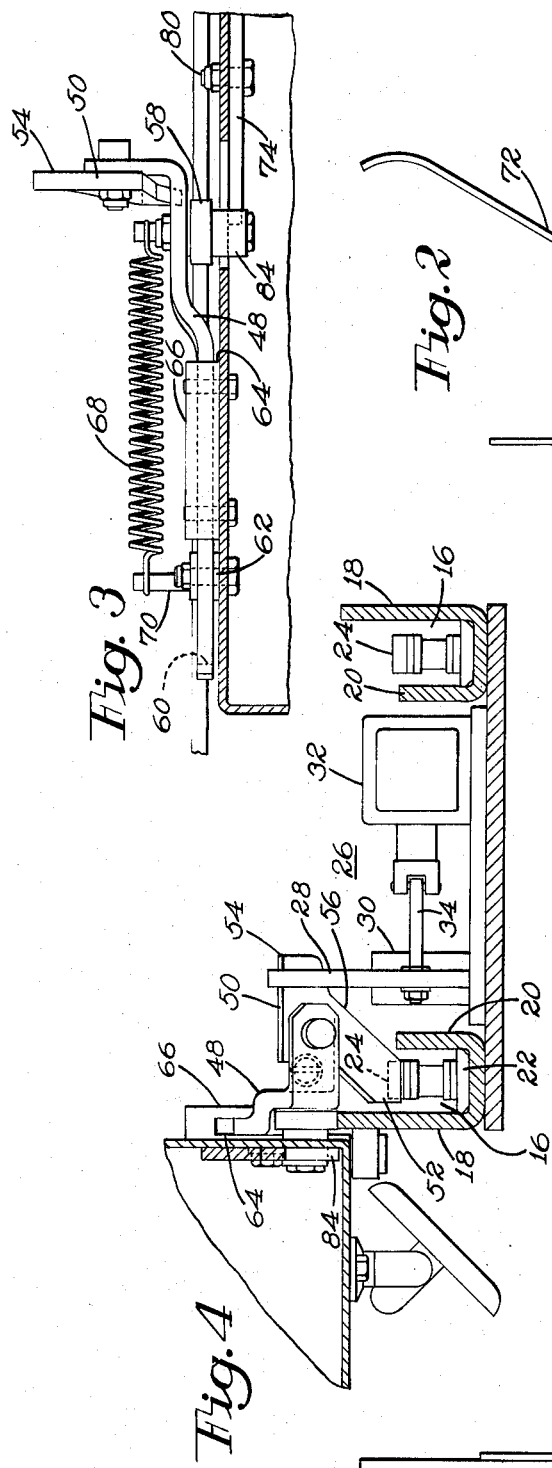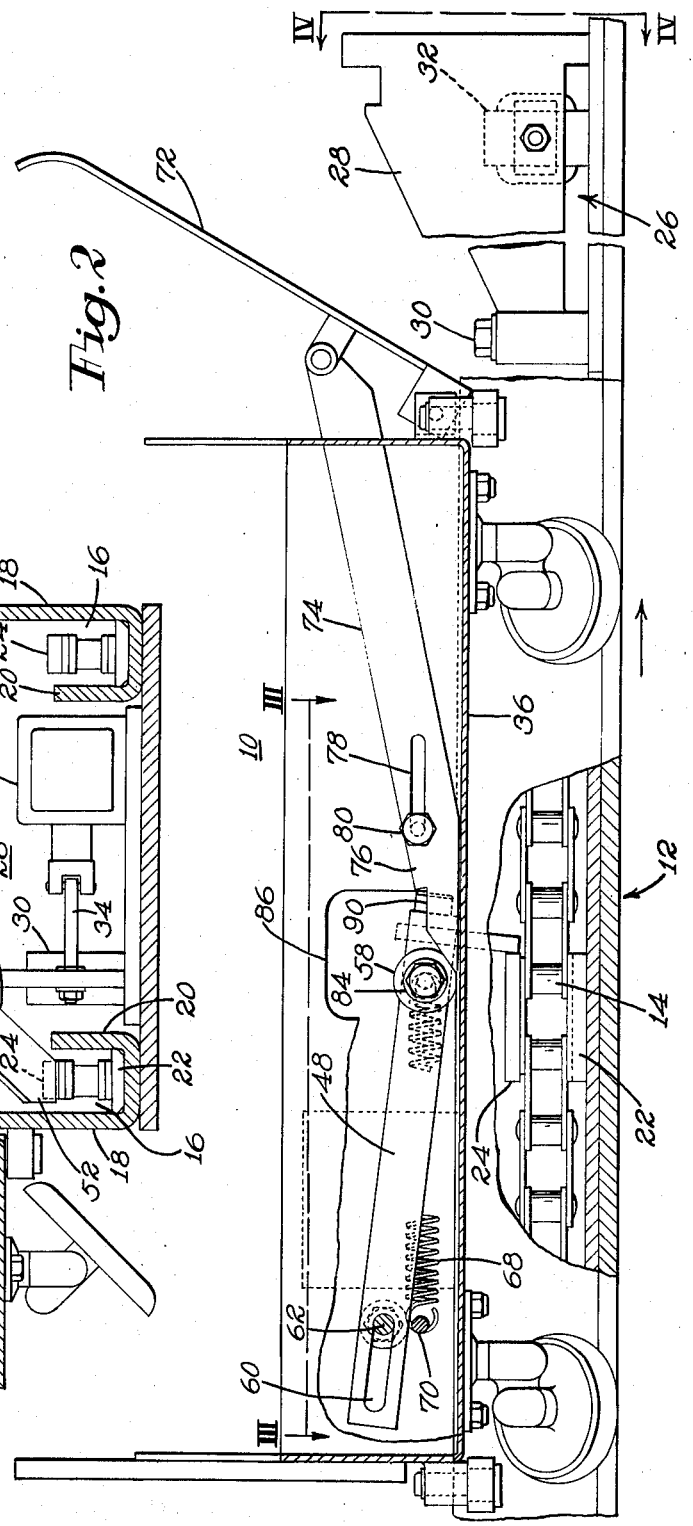

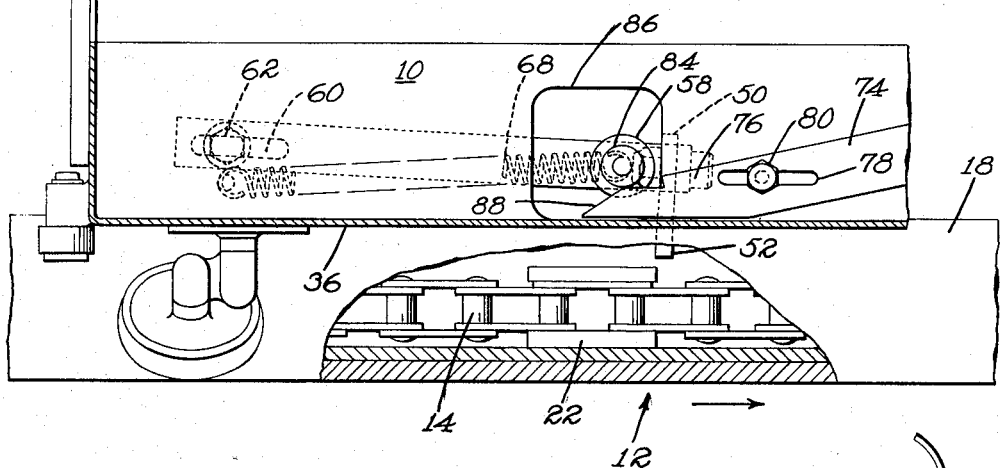
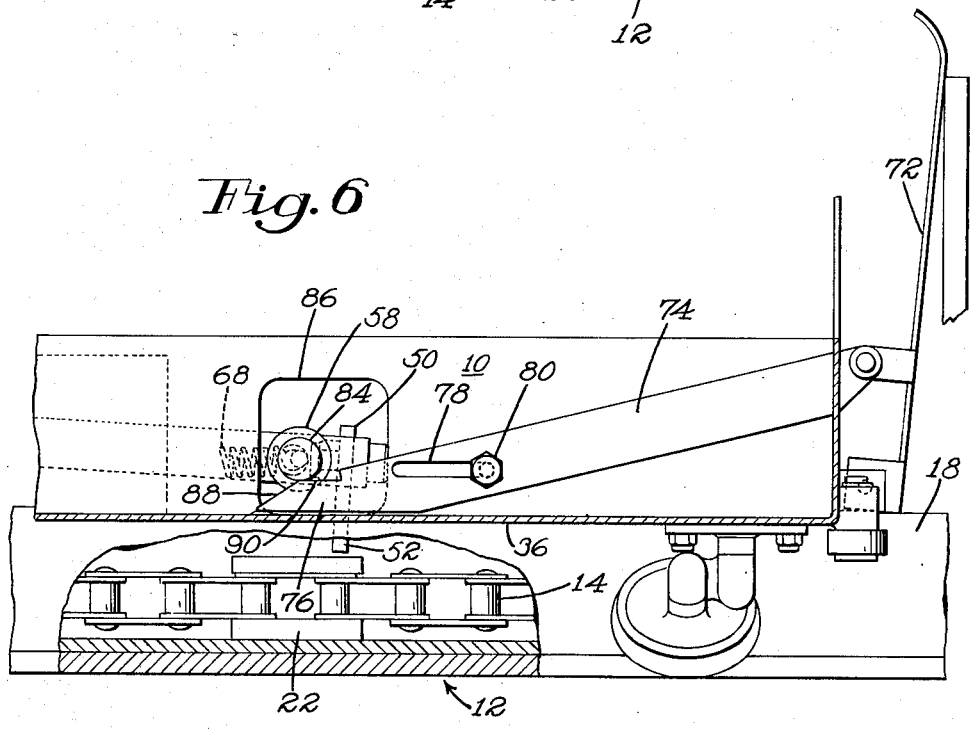

United States Patent Office 3,244,114
Patented Apr. 5, 1966

3,244,114
CONVEYOR APPARATUS
Edward S. Babson, Ipswich, Mass., assignor to United Shoe Machinery Corporation, Flemington, N.J., a corporation of New Jersey
Filed Jan. 17, 1964, Ser. No. 338,482
6 Claims. (Cl. 104—172)

This invention relates generally to article transporting devices, and has particular reference to a rack mechanism adapted for cooperation with a conveyor means to enable the rack to be transported between work stations and to be stopped automatically on arrival at a work station, or to be stopped on engagement with another rack previously stopped at the work station.

In United States Letters Patent No. 3,130,685, issued April 28, 1964 there is disclosed an article transporting system, comprising a floor-mounted conveyor chain, with shoe rack mechanisms adapted to be transported between work stations by said chain. Means is provided on each rack for releasable engagement with the chain, and for cooperation with stop means at the work stations to cause the latch to be disengaged from the conveyor chain when the rack arrives at the work station. Means is also provided on the rack for effecting disengagement of the latch when the rack collides with another rack previously stopped at a work station.

Although the system disclosed in said patent operates satisfactorily in most installations, it has been found that in some cases when a second rack collides with a first rack stopped at a work station, there may be a tendency for the second rack to back away from the first rack. When such movement occurs the latch mechanism of the second rack is permitted to reengage the conveyor chain, which causes the second rack to again collide with the first rack. The second rack thus undergoes an undesirable back and forth movement until the first rack is released and the second rack is permitted to move to the work station.

It has also been found that in some cases a portion of the rack other than the bumper may engage a stationary object, in which case damage to the rack may result since the latch is not automatically disengaged from the conveyor chain unless the bumper is actuated.

An object of this invention is to provide a rack for the purpose described which has bumper means for effecting disengagement of the latch means from the conveyor chain on collision with a preceding rack and also means for preventing subsequent rearward movement of the rack.

A further object of the invention is to provide a rack for the purpose described which has means for causing disengagement of the latch from the conveyor chain when the towing force applied to the latch exceeds a predetermined amount.

Other objects of the invention will be apparent to one skilled in the art from the following detailed description of a specific embodiment thereof.

In the drawings,

FIG. 2 is a view in side elevation partly in section, of the lower portion of an article handling device of the type shown in FIG. 1, illustrating the device being moved toward a stop mechanism by the conveyor chain;

FIG. 3 is a view in section taken on line III—III of FIG. 2;

FIG. 4 is a view in section taken on line IV—IV of FIG. 2;

FIG. 5 is a view similar to FIG. 2, illustrating the action of the chain engagng mechansm of the rack when the rack encounters an obstruction that does not operate the bumper mechanism; and FIG. 6 is a view similar to FIG. 2, illustrating the action of the chain engaging mechanism of the rack when the rack collides with a preceding rack.

Figure 1:
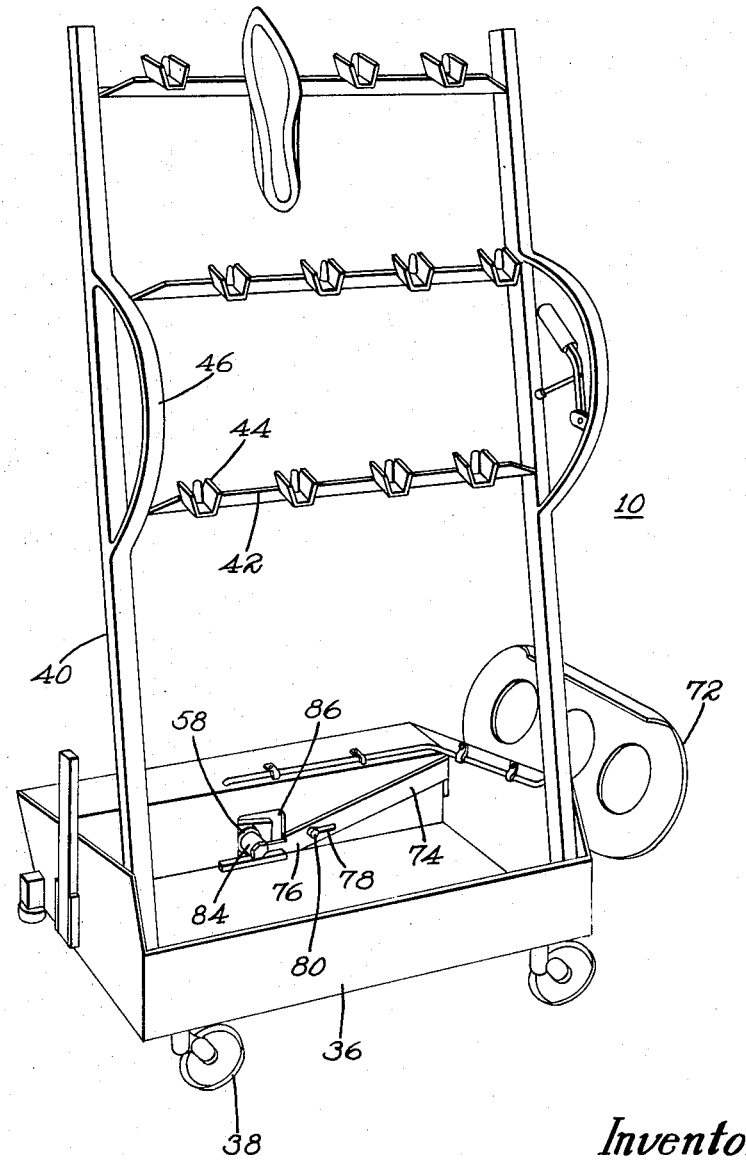
FIG. 1 is a perspective view of an article transporting device embodying the features of the invention.

Referring to the drawings, there is illustrated a rack 10, which in the particular embodiment is adapted for carrying shoes in the process of manufacture, and is provided with means for enabling the rack to be moved along the floor between work stations by means of a conveyor mechanism 12. In the illustrated embodiment, the conveyor mechanism 12 is similar to the mechanism disclosed in the above identified patent and comprises an endless tow chain 14 which travels in a pair of parallel guide channels 16, formed by upstanding guide rails 18 and 20. The chain, during normal operation of the conveyor system, is driven continuously in the direction indicated by the arrows (see FIGS. 2, 5 and 6), and has a series of spaced support blocks 22 disposed on the lower side thereof and a series of spaced pawls 24 disposed on the upper side thereof for cooperation with a tow plate mechanism on the racks 10 in a manner to be described hereinafter. To control the movement of racks along the conveyor, various types of stop devices may be disposed alongside the chain mechanism. Although in the above identified patent several types of stop members are disclosed, for the purpose of the present invention it will be sufficient to illustrate a single type of stop member 26 which may be used at either a work station or a pool position. The stop member 26 comprises a stop arm 28 pivoted to a support post 30 so as to be pivotable between a stop position, in which the arm is disposed generally parallel to the chain, and a pass position in which the arm extends diagonally away from the chain. The arm 28 is moved between these two positions by means of a solenoid 32 connected to the arm 28 by means of a suitable linkage 34.

The rack 10 comprises a base 36 having casters 38 mounted therein to enable the rack to be moved freely in any direction. Extending upwardly from the base is a frame 40 having cross members 42 extending therebetween on which are mounted individual shoe retainers 44. To facilitate manual movement of the racks into and out of operative relationship with the conveyor, forwardly extending handle members 46 are secured to the frame 40 at each end of the rack.

To provide means on the rack for releasable engagement with the tow chain, a towing arm 48 is mounted on one side of the base, in a manner to be described hereinafter, for pivotal movement about the rear end, so that the forward end is capable of a predetermined amount of vertical movement. Disposed on the forward end is a tow plate 50, having a downwardly projecting portion 52 for engagement by a pawl 24 of the chain, and a laterally projecting portion 54 to lift the portion 52 out of engagement with the chain when the rack arrives at a stop 26. Extending between the portions 52 and 54 is an inclined camming surface 56 to enable the tow plate to cam itself over the guide rail 18 when the rack is pushed into operative relation to the chain.

To control the vertical position of the tow plate in relation to the tow chain a roller 58 is mounted on the forward end of the arm 48, positioned to rest on the guide rail when the rack is disposed in operative relation to the tow chain.

The towing arm 48 is so mounted on the base as to be capable of both vertical pivoting movement about the end opposite the tow plate, and a limited amount of longitudinal movement. For this purpose the rear end of the arm is provided with an elongated aperture 60 which is slidably retained on a pivot pin 62. To resist transverse forces applied to the forward end of the arm 48 a wear plate 64 is provided between the arm and the base, and a retaining plate 66 extends over the outside of the arm. The arm is normally retained in the rearmost position by means of a spring 68 connected between the forward portion of the arm and a spring post 70 on the base disposed below the pivot pin 62.

To provide means for releasing the tow plate from the chain when the rack collides with a preceding rack, a bumper 72 is provided on the forward end of the rack, said bumper being pivoted at its lower end to the rack and normally being inclined forwardly. Secured to the bumper is an operating bar 74 which extends rearwardly and is inclined downwardly alongside the adjacent portion of the base of the rack, with the end portion 76 thereof being provided with a guide slot 78, receiving a guide pin 80, to restrain upward and lateral movement of the end of the bar, and to limit the forward and rearward movement of the bumper 72.

To enable rearward movement of the bumper 72 resulting from collision with a preceding rack to effect disengagement of the tow plate from the chain, the forward end of the tow arm 48 is provided with a cam roller 84 which projects through a suitable aperture 86 in the side wall of the base, and the end 76 of the bar 74 is provided with an upwardly sloping cam 88 positioned on the extreme end leading to a horizontal upper surface portion 90.

When the rack is being towed by the chain, the bumper 72 is normally inclined forwardly to the maximum degree permitted by the slot 80 (see FIG. 2). When the bumper is in this position the end of the tow plate operating bar is disposed forwardly of the cam roller 84.

When the bumper 72 moves rearwardly on contact with an obstruction (see FIG. 6), the end of the bar 74 moves rearwardly so that the cam surface 88 passes under the cam roller 84, lifting the forward end of the towing arm so that the downwardly projecting portion 52 of the tow plate is disengaged from the pawl 24 of the chain. After such disengagement, the inertia of the rack causes it to continue to move forwardly for a short distance, causing further rearward movement of the bumper, so that the horizontal upper surface 90 of the bar 74 moves rearwardly to a position directly under the cam roller 84. After the rack comes to rest there is therefore no forward component of force applied by the cam roller to the bar which would tend to force the rack rearwardly by forcing the bumper against the preceding rack. Although the bumper 72 is not quite in the vertical position, at this time, the forward force applied to the preceding rack by the slight forward inclination of the bumper is so small that it is less than the force required to move the rack rearwardly.

When the forward rack subsequently moves away, the bumper 72 drops back to its original position, so that the end 76 of the bar 74 moves forwardly out from under the roller 84 permitting the tow plate 50 to drop back into a position such that it will be engaged by the next pawl 24 of the chain.

Referring to FIG. 5 there is illustrated the action of the tow plate mechanism when the rack encounters an obstruction which does not operate the bumper mechanism. In such case, the rack stops, however the tow plate is still engaged by the chain pawl and continues to move forwardly. As it does so, the spring 68 extends and the cam roller 84 rides up the cam surface 88 on the end of the bar 74, and thereby lifts the depending portion of the tow plate out of engagement with the chain pawl. The spring 68 then retracts the arm to the normal position and the tow arm drops back into position to be engaged by the next pawl. This action is repeated until the obstruction is removed or until the rack is removed from operative relation to the conveyor. The disengagement and reengagement with the chain also produces sufficient noise to attract the attention of operating personnel to the fact that a rack has encountered an obstruction, so that corrective action can be taken.

The above described tow plate arrangement also reduces the stresses applied to the various operating parts when a stationary rack is engaged with the moving chain. A rack loaded with shoes has considerable inertia which must be overcome when the stationary tow plate is engaged by a moving chain pawl. In the illustrated embodiment, when the pawl contacts the tow plate the spring 68 extends slightly to absorb the shock of starting the rack moving. The amount of extension of the spring during such starting is normally not sufficient to permit the roller 84 to contact the cam surface 88.

Since certain obvious changes may be made in the illustrated embodiment of the invention without departing from the scope thereof, it is intended that all matter contained herein be interpreted in an illustrative and not a limiting sense.

Having thus described my invention, what I claim as new and desire to secure by Letters Patent of the United States is:

1. An article transporting device for use with conveyor means of the type described, said device comprising releasable conveyor engaging means, bumper means responsive to collision with a preceding article transporting device for causing disengagement of the conveyor engaging means, and means responsive to a predetermined excessive force applied to the conveyor engaging means to cause disengagement of the conveyor engaging means.

2. An article transporting device for use with conveying means of the type described, comprising a base, conveyor engaging means mounted in the base for vertical movement into and out of engagement with the conveying means, said conveyor engaging means being capable of a predetermined amount of movement in relation to the base in the direction of movement of said conveying means and being biased in the opposite direction, and cam means positioned to cam said conveyor engaging means upwardly out of engagement with the conveying means on said forward movement.

3. An article transporting device for use with conveyor means of the type described, said device comprising releasable conveyor engaging means, cam means for disengaging said conveyor engaging means, bumper means at the forward end of said device responsive to collision with a preceding article transporting device for actuating said cam means to disengage said conveyor engaging means, said conveyor engaging means being movable toward the forward end of said device in response to excessive forces applied thereto, and cam follower means adapted to cooperate with said cam means on said forward movement to effect the disengagement of said conveyor engaging means from the conveyor means.

4. An article transporting device for use with conveyor means of the type described, said device comprising towing means movable into and out of engagement with the conveyor means, said towing means being capable of a predetermined amount of movement toward the forward end of the device and being biased toward the rear end of the device, cam means adjacent to said towing means, said cam means being movable a predetermined distance rearwardly and being biased forwardly, means responsive to the collision of the device with a preceding device for causing said cam means to move rearwardly, said towing means having means positioned for cooperation with said cam means to effect disengagement of said towing means on either rearward movement of said cam means or forward movement of said towing means.

5. An article transporting device for use with conveying means of the type described, said device comprising a base having a towing member movable vertically into and out of engagement with the conveying means, said towing member being capable of a predetermined amount of movement toward the forward end of said base and being biased toward the rear end, a bumper on the forward end of the device, said bumper being actuatable by collision of said device with a preceding device, and a towing member release bar operated by said bumper, said release bar having a cam portion adapted to cooperate with a cam follower portion of the towing member to lift the towing member out of engagement with the conveying means on actuation of the bumper, and a rest portion on said release bar adjacent the cam means, whereby when said bumper has been actuated to disengage the towing member from the conveyor means, the cam follower stops on said rest portion so that no forward force is applied to the bumper by the release bar.

6. An article transporting device for use with conveying means of the type described, comprising a base, conveyor engaging means mounted on the base for vertical movement into and out of engagement with the conveying means, said conveyor engaging means being capable of a predetermined amount of movement in relation to the base in the direction of movement of said conveying means and being biased in the opposite direction, cam means positioned to cam said conveyor engaging means upwardly out of engagement with the conveying means on said movement of said conveyor engaging means in relation to the base in the direction of movement of said conveying means, and means responsive to collision of said article transporting device with a preceding article transporting device to move said cam means in the opposite direction.

References Cited by the Examiner
UNITED STATES PATENTS

| | | | |
|---|---|---|---|
| 797,610 | 8/1905 | Schaefer | 104—172 |
| 2,751,852 | 6/1956 | Joy. | |
| 2,987,012 | 6/1961 | King | 104—172 |
| 3,072,073 | 1/1963 | Peterson et al. | 104—172 |
| 3,106,172 | 10/1963 | Robbins et al. | 104—172 |
| 3,119,347 | 1/1964 | Dehne | 104—172 |
| 3,130,688 | 4/1964 | Goodrich et al. | 104—172 |

FOREIGN PATENTS

| | | |
|---|---|---|
| 612,793 | 11/1948 | Great Britain. |

ARTHUR L. LA POINT *Primary Examiner.*

F. W. MONAGHAN, *Assistant Examiner.*